United States Patent
Takekoshi et al.

Patent Number: 5,600,619
Date of Patent: Feb. 4, 1997

[54] OPTICAL HEAD

[75] Inventors: Taro Takekoshi; Tomohiro Makigaki; Hirokazu Ito; Toshio Arimura, all of Nagano-ken, Japan

[73] Assignee: Seiko Epson Corporation, Nagano-ken, Japan

[21] Appl. No.: 428,132

[22] PCT Filed: Sep. 26, 1994

[86] PCT No.: PCT/JP94/01579

§ 371 Date: Apr. 28, 1995

§ 102(e) Date: Apr. 28, 1995

[87] PCT Pub. No.: WO95/09418

PCT Pub. Date: Apr. 6, 1995

[30] Foreign Application Priority Data

Sep. 27, 1993 [JP] Japan ................... 5-240091

[51] Int. Cl.$^6$ ..................... G11B 7/00
[52] U.S. Cl. ............ 369/112; 369/44.12; 359/820; 250/216
[58] Field of Search ................ 369/112, 44.12, 369/44.14, 44.15, 44.16; 359/820; 250/216; 358/296

[56] References Cited

U.S. PATENT DOCUMENTS

| | | | |
|---|---|---|---|
| 5,005,162 | 4/1991 | Mitsumori et al. | 369/44.12 |
| 5,313,333 | 5/1994 | O'Brien et al. | 359/820 |
| 5,396,061 | 3/1995 | Taniguchi | 369/112 |

FOREIGN PATENT DOCUMENTS

2-240839  9/1990  Japan.

*Primary Examiner*—Loha Ben
*Attorney, Agent, or Firm*—Oliff & Berridge

[57] ABSTRACT

An integrally-driven type optical head (1) in which a laser optical system (20) provided with a semiconductor laser (22) and a light receiving device is mounted in a moving part of an actuator (50). In this optical head, the moving part (5) is constituted by uniting a heat radiator (10) made of a metal or the like with a heat insulator (9) made of a plastic or the like. The heat conduction bonding of the heat radiator to the semiconductor laser is performed. A coil of the actuator is securely fixed to this heat radiator through the heat insulator. Thereby, heat generated from the semiconductor laser is transferred to the heat radiator and is then radiated from the surface of the heat radiator to the external space of the optical head. Further, in case where heat is generated by the coil when the actuator operates, the laser optical system can be prevented from being heated, because of the fact that the heat conductivity between the coil and the laser optical system is low. Moreover, an increase in weight of the head, which is a hindrance to an operation thereof, can be prevented. Simultaneously with this, the rigidity of a holder can be increased. Thus an occurrence of harmful resonance can be prevented during the actuator is driven. Therefore, the heat radiation/cooling characteristics of the semiconductor laser can be considerably improved. Consequently, a stable operation of the apparatus and the reliability thereof can be achieved.

15 Claims, 8 Drawing Sheets

OPTICAL HEAD

TECHNICAL FIELD

This invention relates to a small-sized and lightweight optical head (or optical pickup) of the type, in which a semiconductor laser, a light receiving device, an objective lens and so on are driven integrally, and more particularly to a structure for radiating heat generated by a semiconductor laser of an optical head, or to a cooling structure thereof. Incidentally, it is assumed that an optical head of the present invention is primarily of the type, in which information is recorded on or reproduced from an optical disk.

BACKGROUND ART

There has been a conventional optical head of such a type, in which a package of a semiconductor laser is exposed and is cooled by the wind pressure of wind due to the rotation of an optical disk as disclosed in Japanese Patent Public Disclosure No. 2-240839/1994 Official Gazette.

However, such a heat radiation technique employed in the conventional optical head is not effective for the following reasons. Namely, there is a limit to the area of the exposed package. Further, the semiconductor laser is very likely to collide with the optical disk, because it is necessary for utilizing the wind pressure of wind caused by the rotation of the optical disk to bring the semiconductor laser very close to the optical disk. Moreover, the wind caused by the rotation of the optical disk is weak in itself and thus has little effect on the heat radiation in the case of using a low revolution optical disk. Consequently, the conventional optical head has a problem in that the characteristics of a signal is degraded owing to heat produced in the semiconductor laser and a laser optical system. Furthermore, an optical head equipped with a high output semiconductor laser for the purpose of recording and reproducing information can not be developed. Additionally, practical uses of the conventional optical head have been limited to a read-only compact disk (CD) player.

The present invention is accomplished to eliminate the drawbacks of the conventional optical head.

Accordingly, a main object of the present invention is to obtain a heat-radiating and/or cooling structure which is more efficient by far than that of the conventional optical head, to avoid increase in weight of a movable part involved in such a heat radiation structure and to improve the control characteristics of an actuator.

DISCLOSURE OF THE INVENTION

1. An optical head of the present invention is an integrally-driven type optical head in which a laser optical system provided with a semiconductor laser and a light receiving device is mounted in a moving part of an actuator, and is characterized in that the moving part is constituted by uniting a heat radiator made of a high heat conductivity material with a heat insulator made of a low heat conductivity material, that the heat conduction bonding of the heat radiator to the semiconductor laser is performed and that a coil of the actuator is securely fixed to this heat radiator through the heat insulator. Thereby, heat generated from the semiconductor laser is transferred to the heat radiator and is then radiated from the surface of the heat radiator to the external space of the optical head. Further, in case where heat is generated by the coil when the actuator operates, the laser optical system can be prevented from being heated, because of the fact that the heat conductivity between the coil and the laser optical system is low.

2. In the optical head of the item 1, the heat radiator is a holder for holding the laser optical system. Thereby, the entire holder can be used as a heat radiator. This optical head excels in volumetric efficiency and can be miniaturized.

3. In the optical head of the item 1, the heat radiator is made of a lightweight metal such as a magnesium alloy or an aluminum alloy. Thereby, the moving part can be prevented from being increased.

4. In the optical head of the item 1, the heat insulator is made of a resin such as a plastic. Thereby, the coil is insulated from the heat radiator. Thus the laser optical system is never heated. Moreover, the weight of the moving part can be prevented from being increased.

5. In the optical head of the item 1, the heat radiator is electrically insulated from the semiconductor laser. Thereby, external electric noises including static electricity can be prevented from being given to the semiconductor laser. Thus this optical head serves to prevent the semiconductor laser from being broken.

6. In the optical head of the item 1, the heat radiator is electrically grounded. Thereby, the surroundings of the light receiving device of the laser optical system can be shielded. The degradation of the reproduction signal characteristics due to the external electric noises can be prevented.

7. In the optical head of the item 1, a heat transfer member is provided as a heat transfer path from the semiconductor laser to the heat radiator. Thereby, the thermal resistance between the semiconductor laser and the heat radiator is reduced and the cooling characteristics are improved.

8. In the optical head of the item 1, a compact heat sink or heat spreader is embedded in a package enclosing the semiconductor laser, and this heat sink or heat spreader is made of a copper material. Thereby, the thermal resistance of the package is reduced and the cooling characteristics are improved.

9. An integrally-driven type optical head comprises a laser optical system provided with a semiconductor laser and a light receiving device, a holder equipped with this laser optical system and integrally driven, and an actuator serving as a mechanism for driving this holder, and is characterized in that the holder is provided with a heat radiator for transferring and radiating heat generated by the semiconductor laser, that the position of the center of gravity of this heat radiator and the position of the center of gravity of the laser optical system are respectively on the opposing sides of the position of the center of gravity of the holder and that this heat radiator is a balancer for correcting a deviation from the weight equilibrium between the elements provided on both sides of the position of the center of gravity of the holder. Thus the heat radiator further has the functions of the balancer. An increase in weight, which may be a hindrance to an operation of the optical disk, can be avoided. Moreover, the good weight balance of the holder can be achieved. Furthermore, the control characteristics of the actuator are improved.

10. In the optical head of the item 9, the holder is made of a low heat conductivity material such as a plastic and the heat radiator is made of a high heat conductivity material such as a metal. Thereby, heat generated from the semiconductor laser is transferred to the heat radiator and is then radiated from the surface of the heat radiator to the external space of the optical head. Further, in case where heat is generated by the coil when the actuator operates, the laser optical system can be prevented from being heated, because of the fact that the heat conductivity between the coil and the laser optical system is low.

11. An integrally-driven type optical head comprises a laser optical system enclosing a semiconductor laser and a light receiving device, a holder equipped with this laser optical system and integrally driven, and an actuator serving as a mechanism for driving this holder, and is characterized in that the holder is provided with a heat radiator for transferring and radiating heat generated by the semiconductor laser and that this heat radiator is fixed to the holder and serves as a reinforcing member for reinforcing the holder. Thereby, the rigidity of the holder can be increased. Moreover, an occurrence of harmful resonance can be prevented during the actuator is driven.

12. In the optical head of the item 11, the holder is made of a low heat conductivity material such as a plastic and the heat radiator is made of a high heat conductivity material such as a metal. Thereby, heat generated from the semiconductor laser is transferred to the heat radiator and is then radiated from the surface of the heat radiator to the external space of the optical head. Further, in case where heat is generated by the coil when the actuator operates, the laser optical system can be prevented from being heated, because of the fact that the heat conductivity between the coil and the laser optical system is low.

BRIEF DESCRIPTION OF DRAWINGS

All of FIGS. 1 to 8 are diagrams for illustrating optical heads embodying the present invention.

Further.

BEST MODE FOR CARRYING OUT THE INVENTION

The present invention will be described in detail by referring to the accompanying drawings, namely, FIGS. 1 to 8.

(Embodiment 1)

Figure 1:
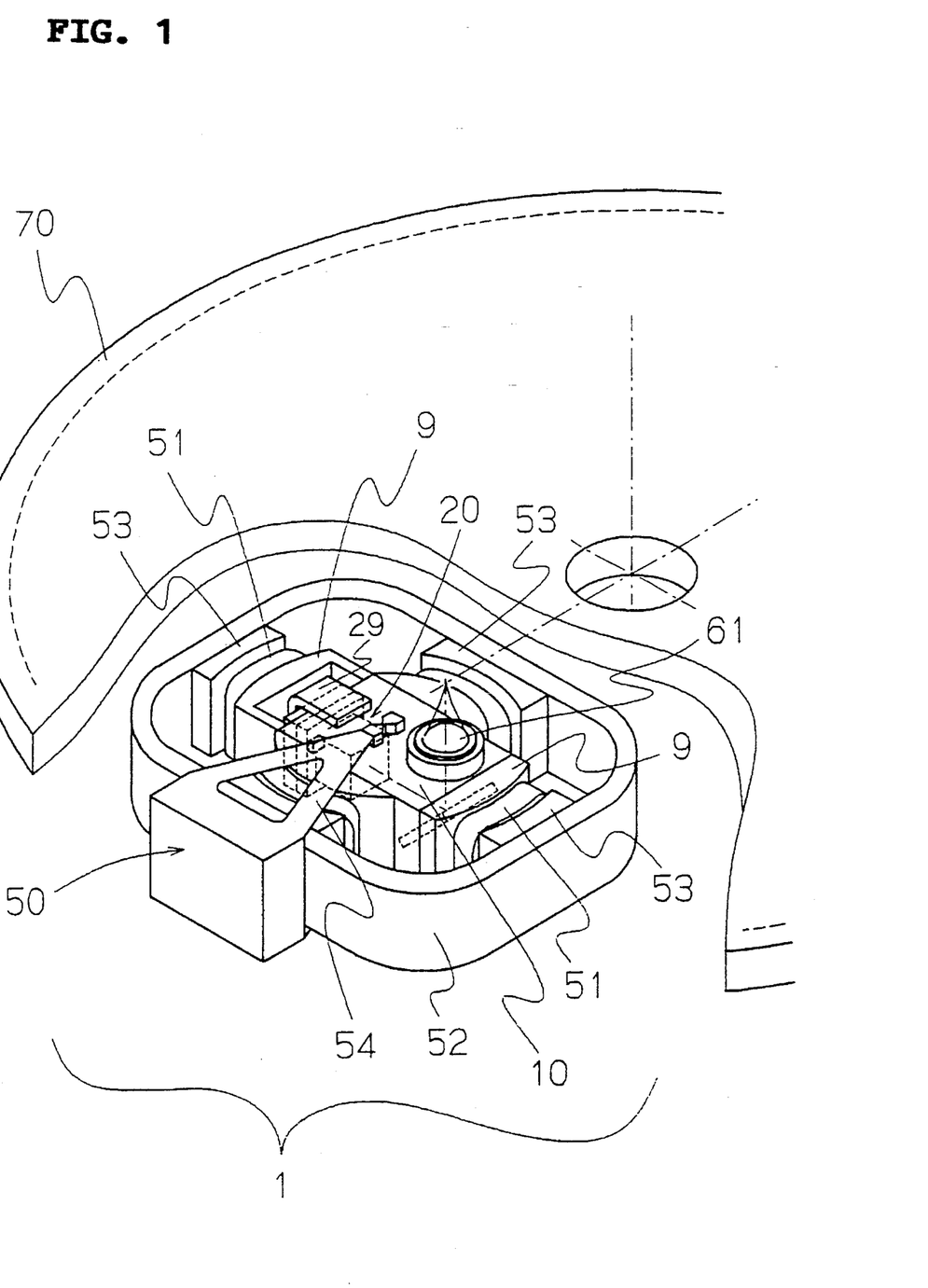
FIG. 1 is a perspective view of an optical head which is Embodiment 1 of the present invention.
Figure 2:
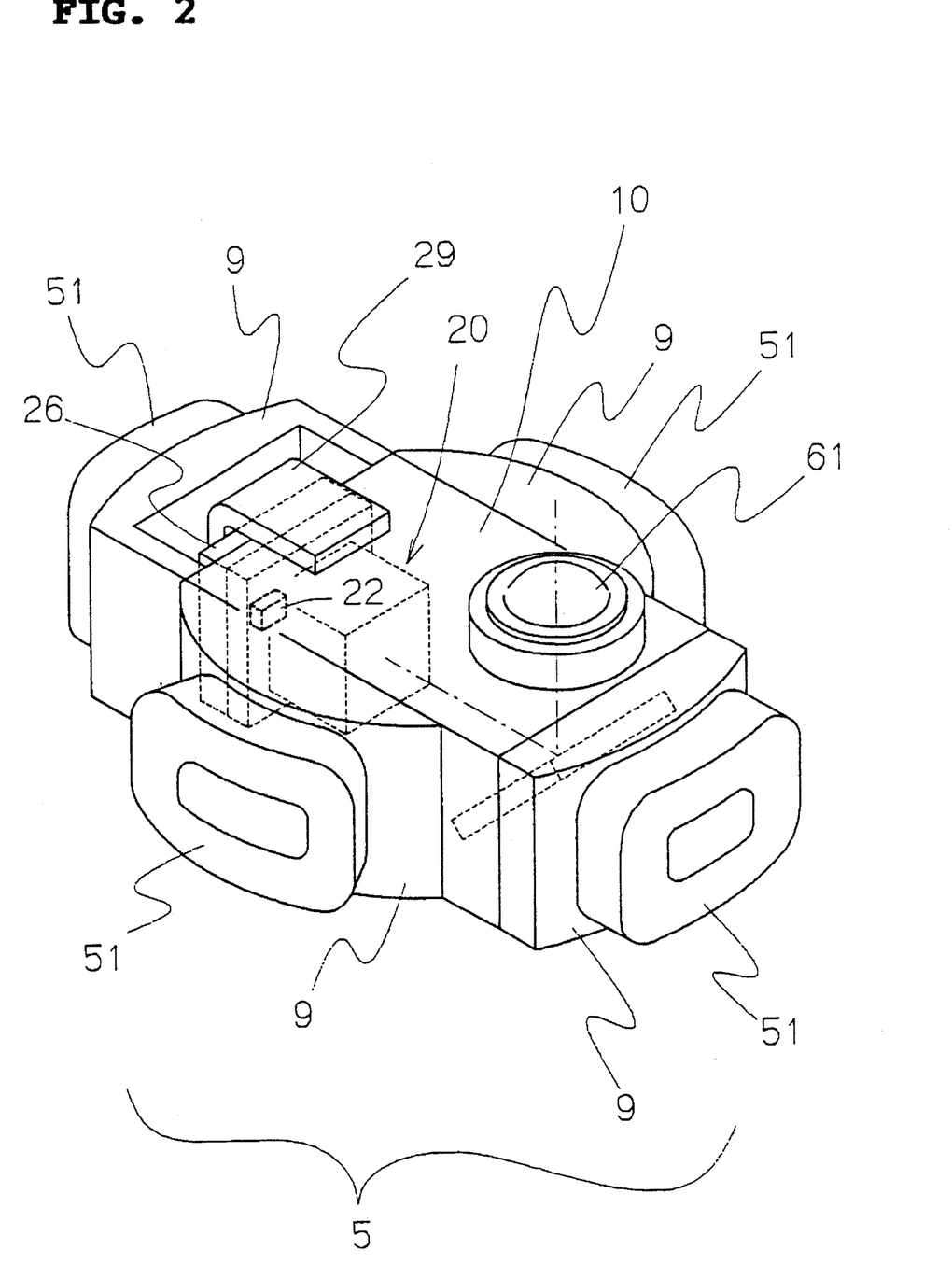
FIG. 2 is a perspective view of a moving part of the optical head, namely, of Embodiment 1 of the present invention.

FIG. 1 is a perspective view of an optical head 1 which is Embodiment 1 of the present invention. FIG. 2 is an enlarged perspective view of a moving part 5 of FIG. 1. Reference numeral 10 designates a heat radiator of this embodiment, which has both of the function of radiating heat and the function of a holder. A laser optical system 20 is enclosed in this heat radiator. Further, a heat insulator 9 and a plurality of coils 51 are fixedly mounted on the periphery of the heat radiator 10 and compose the integrated moving part 5. The coils 51 of the moving part 5 and a magnetic circuit consisting of a yoke 52 and a magnet 53 placed on a stationary part (namely, on a carriage (not shown)) constitute what is called a moving coil type actuator 50. Further, reference numeral 54 denotes a suspension for holding the moving part 5 movably. This actuator 50 is energized and controlled by a servo control circuit (not shown) according to error signals (namely, a focus error signal and a track error signal (to be described later)) detected by the laser optical system 20. The heat radiator 10 is positioned precisely in the direction vertical to (namely, in the focusing direction of) an optical disk 70 and in the direction of a radius (namely, in the tracking direction) thereof. Thus light passing through an objective lens 61 mounted on the moving part 5 is focused on a recording surface of an optical disk 70 and is controlled by the servo control circuit in such a manner as to follow a track groove.

Generally, a holder composing a moving part of a conventional optical head is made of a plastic material. This embodiment of the present invention is, however, characterized in that as the heat radiator 10 is used as a holder composing the moving part 5 and is made of a lightweight metallic material. This heat radiator 10 is a die-cast mold made of magnesium, aluminum or an alloy whose principal ingredient is one of these elements. Among such alloys, a magnesium alloy, which has high heat conductivity and also has nearly the same gravity as that of a plastic material (namely, 1.7), is most appropriate for the heat radiator. The heat insulator 9 intervening between the heat radiator 10 and each of the coils 51 is made of a plastic material having low heat conductivity.

Figure 3:
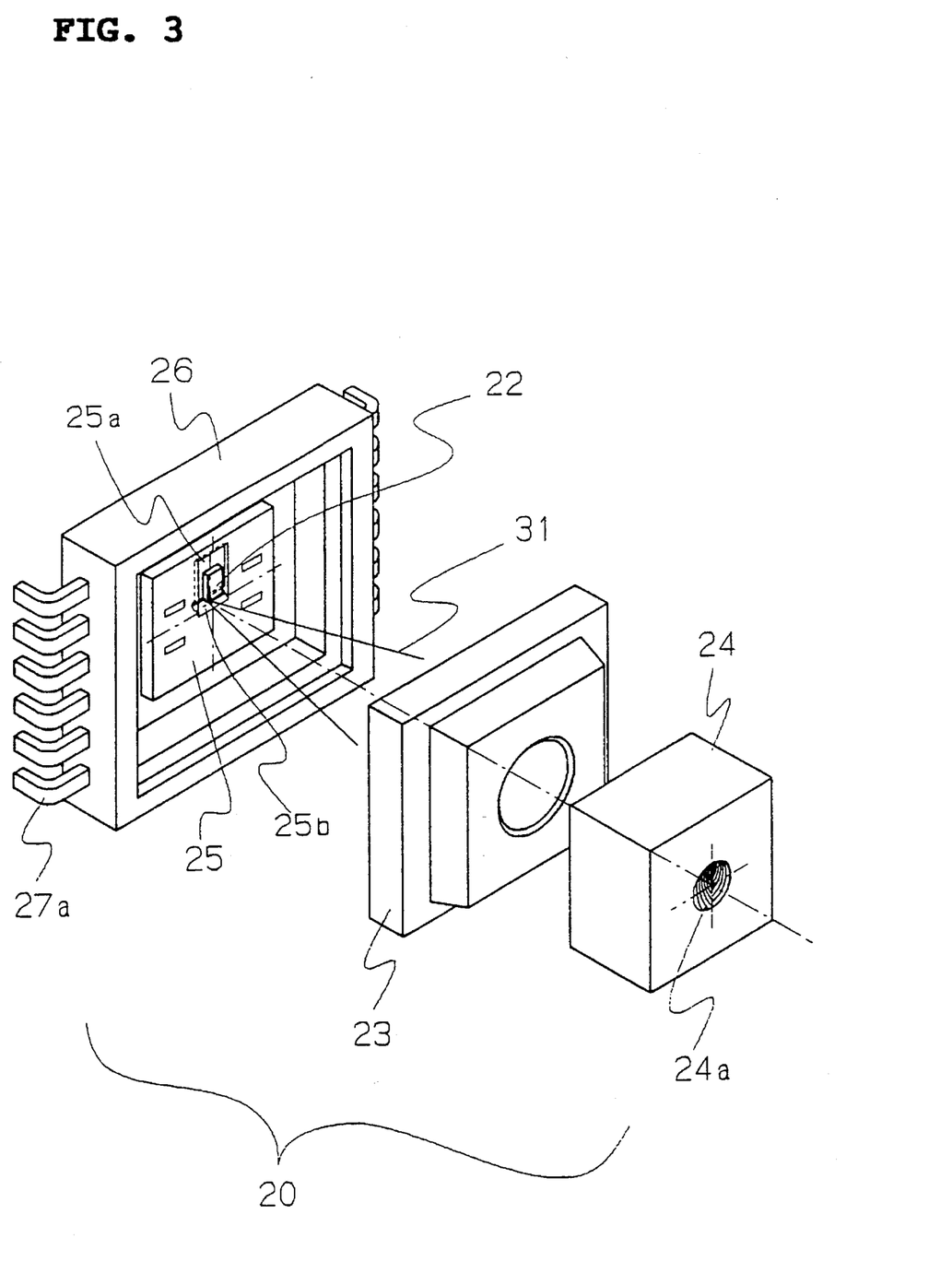
FIG. 3 is an exploded perspective view of the inside of the optical head, namely, Embodiment 1 of the present invention.

FIG. 3 is an exploded perspective view of the inside of the laser optical system 20 of Embodiment 1. The internal structure of the laser optical system 20 enclosed in the optical head 1 will be described by referring to this figure. Reference numeral 22 designates a light emitting device constituted by a semiconductor laser; 23 an optical member called "a cover plate"; 24 a hologram medium on which an interference pattern 24a for separating a luminous flux is formed; and 25 a light receiving device which is a multi-split photodiode. Further, reference numeral 26 denotes a package for holding and enclosing the semiconductor laser 22 and the light receiving device 25 and can be formed from an epoxy resin or a ceramic material. Incidentally, in the case of this embodiment, the package is formed from an epoxy resin in consideration of the cost of components thereof and the mass-producibility thereof by performing an insert molding in such a manner as to include a lead frame 27a. Further, the package 26 is a frame element which has an aperture made only in one side portion thereof. Moreover, the aperture is covered with and is bonded to the optical member 23, so that the package is closed airtightly. Then, these elements are united to form the laser optical system 20 of this embodiment. In the case of the laser optical system 20, a light source is integral with a detection optical system with the intention of combining the functions of these composing elements into a single unit. Further, the outside shape of the entire laser optical system 20 is a small cube which is about 5 mm cubic.

Here, in the case of this embodiment, a recess 25a and an inclined surface 25b are formed in the nearly central portion of the light receiving device 25 as shown in FIG. 3 to minimize the number of components. Further, the semiconductor laser 22 is horizontally mounted in the recess 25a. A light beam emitted from the plane of output is reflected on the inclined surface 25b so as to output the reflected light beam in the direction perpendicular to the flat surface of the light receiving device 25 as a divergent light beam 31. The inclined surface 25b is inclined at almost 45 degrees to the flat surface of the light receiving device 25. Further, the inclined surface 25b and the recess 25a can be relatively easily formed in the light receiving device 25 composed of a silicon substrate by performing an anisotropic etching thereon. Incidentally, a reflection surface having a high reflectance factor can be obtained by depositing a gold thin film on the inclined surface 25b. At this point in time, the technology of a semiconductor laser of the surface emitting type has not been established yet. Therefore, a light receiving device and a semiconductor laser can not be integrally produced in the form of a complete monolithic chip in a continuous process. Thus, it is best to mount a separated laser chip, namely, the semiconductor laser 22 in the light receiving device 25 through the aforementioned process and output the light beam 31 in the direction perpendicular to the flat surface of the light receiving device 25 by utilizing the inclined surface 25b. Incidentally, with the recent rapid advances in micromachining technology, this technique has been embodied.

Figure 4:
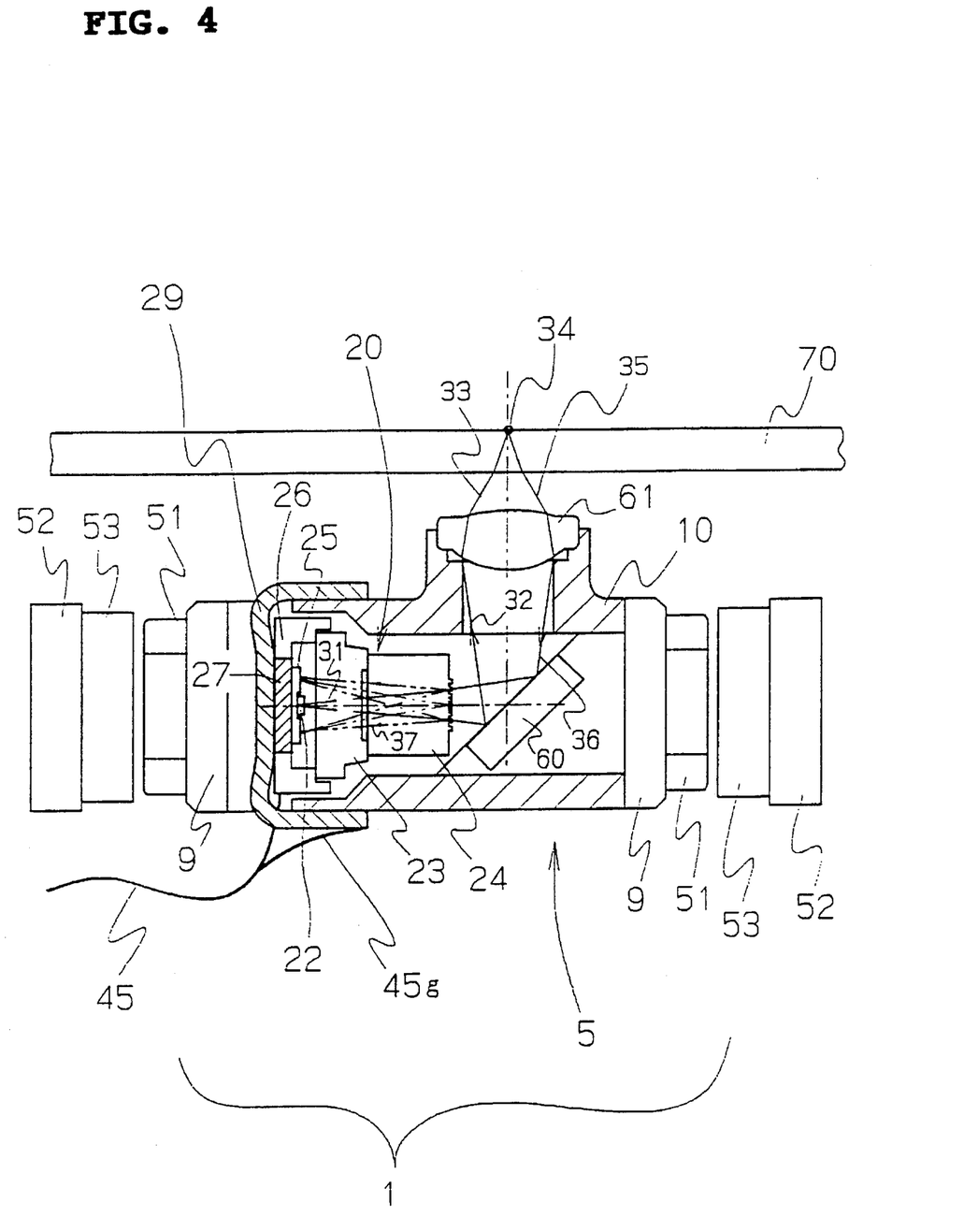
FIG. 4 is a sectional view of the optical head, namely, Embodiment I of the present invention.

FIG. 4 is a sectional view of the internal structure of the entire optical head 1, namely, Embodiment 1 of the present invention. The laser optical system 20 is enclosed in the aforementioned heat radiator 10 to form the one-piece moving part 5. In the heat radiator 10, a mirror 60 and an objective lens 61 are mounted in addition to the laser optical system 20. All of these composing elements are driven as the single-piece moving part 5. The objective lens 61 is a single lens and constitutes a compact optical system which is a finite system. Practically, the distance between a light emitting point of the semiconductor laser 22 and a spot 34 (namely, the distance between an object point and an image point) is only about 15 mm and is thus short. Thus the heat radiator 10 is miniaturized and the entire moving part 5 is lightweight and is about 2 g. Moreover, the thickness thereof is reduced by utilizing the mirror 60 for bending an optical path. Reference numeral 45 denotes an FPC (flexible printed circuit) serving as a signal line for the semiconductor laser 22 and the light receiving device 25. Further, reference numeral 70 denotes an optical recording medium, namely, an optical disk, on the recording surface of which track grooves (not shown) are formed at an infinitesimal pitch.

Next, the optical function of the optical head 1 of this embodiment will be described. Here, only the gist of the optical function thereof will be described because the optical function is not essential to the present invention. As illustrated in FIG. 4, the outward light beam 31, which is a divergent light beam emitted from the semiconductor laser 22, is incident on the nearly central part of the optical member 23. Then, the light beam passes therethrough and further goes out of the hologram medium 24. Subsequently, light 32 of 0th order (light beam which is not diffracted by the hologram 24) is incident on the mirror 60 and the objective lens 61. Next, the image of a spot 34 is formed from a light flux 33 converged by the objective lens 61 on the recording surface of the optical disk 70. Light beam 35 reflected by the optical recording medium 70 follows an inverse optical path. Then, the light beam 35 becomes a light beam 36 which is further incident on the hologram medium 24. Subsequently, the hologram medium 24 transmits a return light beam 37 which is +/− first-order light diffracted by the hologram medium 24. Thereafter, the light beam 37 impinges on the light receiving surface of the light receiving device 25, namely, the surface thereof. In the case of this embodiment, an astigmatism method is used as a method for detecting a focus error signal. On the other hand, a push-pull method is used as a method for detecting a track error signal. Although the detailed description of the diffraction pattern 24a of the hologram medium 24 is omitted, the diffraction pattern 24a is divided into regions and the optimal design of the diffraction pattern regions is carried out to implement such a detection method.

Meanwhile, the optical head I of the integrally-driven type constructed as above described has many advantages in that the downsizing thereof can be achieved, that the number of components can be reduced and that moreover, there occurs no change in position of an optical system from the semiconductor laser 22 to the objective lens 61, in comparison with the conventionally commercialized optical head of the separately driven type, namely, the optical head of the type in which a laser optical system including a semiconductor laser is held on a base on the stationary side and only an objective lens is driven. On the other hand, the optical head I has a structure in which heat generated by the semiconductor laser 22 is confined in the laser optical system 20 and the moving part 5. Thus the optical head 1 has encountered the problems in that the characteristics of the semiconductor laser 22 itself are deteriorated due to the heat generated therefrom and that the characteristics of a signal are degraded by heating the light receiving device 25. Incidentally, it is assumed that this embodiment is applied to a rewritable optical disk unit (a magneto-optic disk or the like). A relatively high output semiconductor laser, the optical power output levels of which range from 30 to 50 mW, is used as the specified semiconductor laser 22. Such a high output semiconductor laser, however, has large power loss. Namely, the power loss of about 100 mW is generated in such a semiconductor laser. Consequently, a considerably large quantity of heat is generated from the junction in the semiconductor laser 22.

Figure 5:
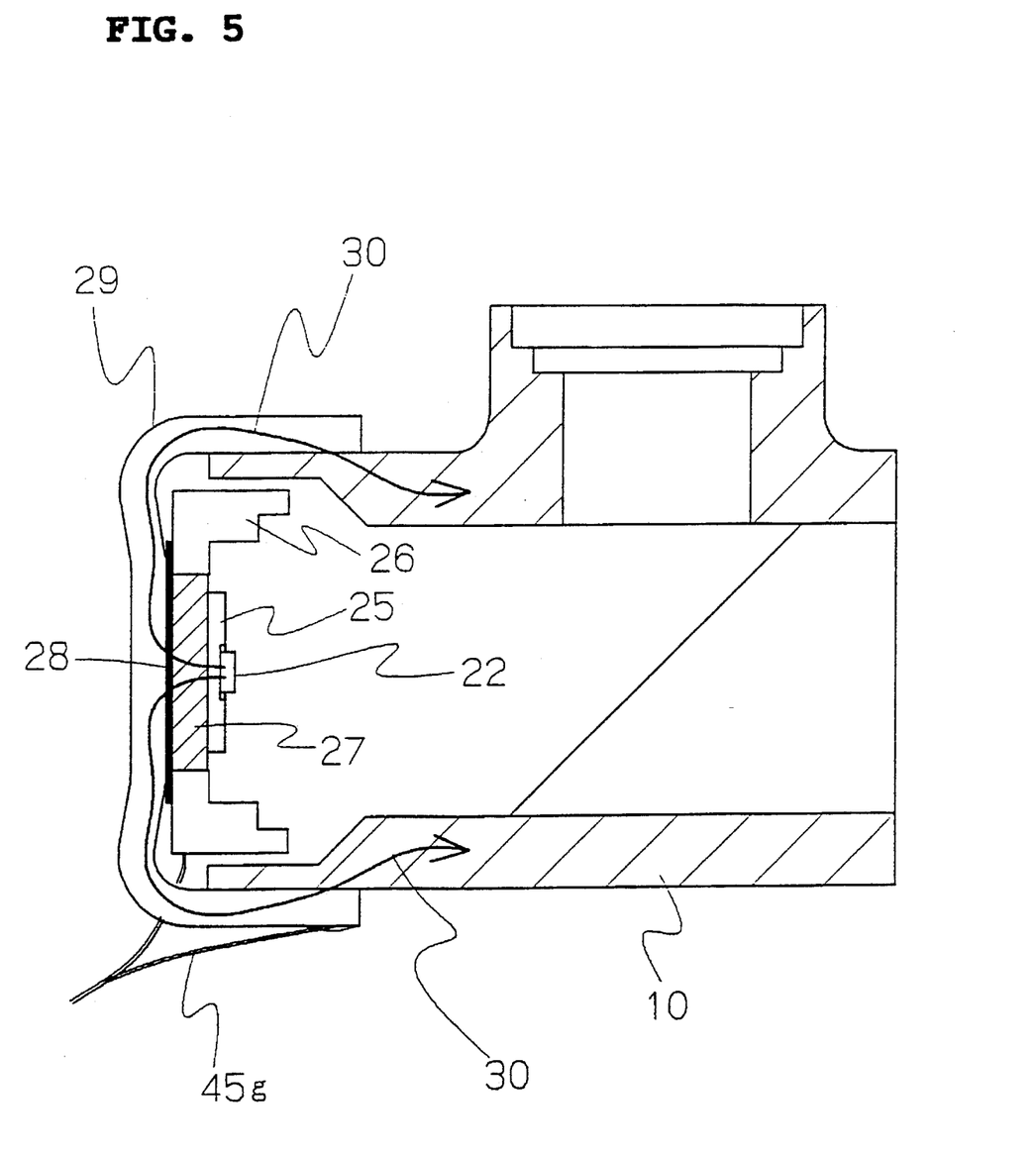
FIG. 5 is a sectional view of a heat transfer path of Embodiment 1 of the present invention.

As shown in FIGS. 4 and 5, a metallic heat sink 27 is embedded in and bored through the package 26 of the laser optical system 20. Further, a heat transfer member 29 is connected to this heat sink 27. The heat sink 27, which is approximately 3 mm square and is not less than 1 mm in thickness, is made of pure copper or a metallic material whose main ingredient is copper. Therefore, as for the heat transfer characteristics, such a material of the heat sink is best. On the other hand, increase in weight owing to this material is within several tens mg. The light receiving device 25 equipped with the semiconductor laser 22 is fixed to the surface of the heat sink 27 on the inside of the package 26. Further, a heat transfer member 29 is brought into abutting engagement with the rear of the heat sink 27 through an insulating film 28. The insulating film 28 is obtained by interposing a film made of polyimide, polyester or the like or by applying an insulating coat to the surface of the heat sink 27 or of the heat transfer member 29. The heat transfer member 29 is made of an alloy material containing copper, which excels in workability. On the other hand, the electrical connection between the heat transfer member 29 and the heat radiator 10 is secured. The heat transfer member 29 is connected to a ground line 45g and thus is grounded on a circuit board (not shown) of a drive unit.

The heat sink 27 is integral with the lead frame 27a (see FIG. 3) formed (by performing an insert molding) in such a manner as to be embedded in the package 26. Thus, the heat sink 27 is embedded in the package 26 when forming the package. Therefore, this excels in workability. Incidentally, this embodiment is constructed so that the heat sink 27 is exposed from the rear of the package 26. However, the present invention is not limited to this embodiment. The heat sink 27 may be exposed by being protruded from the side of the package 26 in such a fashion as to be also used as a part of terminals of the lead frame 27a (see FIG. 3). In this case, the shape of the heat transfer member 29 may be changed a little. Alternatively, a heat conduction bonding of a part of terminals of the lead frame 27a (see FIG. 3) to the heat radiator 10 may be performed.

Incidentally, in the case of this embodiment, the heat sink 27 is exposed from the rear of the package 26. Instead, a part (0.3 mm or so) of the heat sink 27 may be embedded in the rear of the package, though a little increase in thermal resistance is expected. This method is called a heat spreader method, by which the electrical insulation of the heat sink from the heat transfer member 29 is automatically secured and thus a simple structure is obtained.

As illustrated in FIG. 5, the heat generated from the junction in the semiconductor laser 22 is transferred to the heat radiator 10, which serves as an element for radiating heat, through a heat transfer path 30. Then, the transferred heat is radiated from the surface of the heat radiator 10 to an external space. The weight of the heat radiator 10 is approximately 0.6 g when made of a magnesium alloy. Thus the heat radiator 10 has sufficient heat capacity.

As described above, the semiconductor laser 22 used in this embodiment necessarily generates a large quantity of heat. For example, if the radiator 10 is not provided therein, a 20 to 30 degrees centigrade rise in the junction temperature of the semiconductor laser 22 may occur when the optical head is in a high emission optical power output state at the time of writing information to the optical disk. For instance, when the semiconductor laser 22 is driven on condition that the ambient temperature is 50 degrees centigrade in a windless state, the junction temperature thereof reaches almost 80 degrees centigrade. In case where the temperature rises to such a level, the physical property of the junction in the semiconductor laser 22 varies with time and as a result the lifetime of the semiconductor laser 22 becomes extremely short. In contrast, it has been experimentally demonstrated that this rise in temperature can be restricted to about 5 degrees centigrade by providing the heat radiator 10 having sufficient capacity and surface area in the optical head similarly as in the case of this embodiment. Therefore, even in the case of an operation at the ambient temperature of 50 degrees centigrade, the junction temperature of the semiconductor laser 22 can be equal to or lower than 60 degrees centigrade which is commonly known as a reliability assuring temperature. Therefore, the degradation of the semiconductor laser 22 can be prevented. Moreover, the light receiving device 25 equipped with the semiconductor laser 22 is prevented from being heated and being subjected to change in signal characteristics. Thus the reliability of such a device can be improved. Incidentally, the junction temperature of the semiconductor laser 22 is measured by utilizing the property that the voltage developed across the terminals of the semiconductor laser having a diode junction varies linearly with temperature. The details of this method are prescribed in, for example, Military Specification as a thermal resistance measurement method.

Moreover, this embodiment is provided with the heat sink 27 and the heat transfer member 29 as the heat transfer path 30 from the semiconductor laser 22 to the heat radiator 10. Thus the thermal resistance between the semiconductor laser and the heat radiator 10 is reduced and the cooling characteristics are improved.

Therefore, in the case of this embodiment, the heat radiator 10 itself can very efficiently radiate heat generated by the semiconductor laser 22 of the laser optical system 20 to the exterior thereof. Furthermore, the weight of the moving part is not increased because of the fact that a lightweight magnesium alloy is used as the material of the heat radiator 10. Additionally, the rigidity of the heat radiator 10 can be considerably increased in comparison with the conventional holder made of plastics.

Incidentally, the heat radiation effects can be further improved by, for example, cutting grooves in or forming many fins on the surface of the heat radiator 10. Moreover, instead of the aforementioned method of placing the semiconductor laser 22 on the light receiving device 25, a method of placing the semiconductor laser 22 next to the light receiving device in the direction of the flat surface may be employed as the method of mounting the semiconductor laser 22. In this case, the semiconductor laser 22 can be connected directly to, for instance, the heat sink 27. Therefore, the cooling effects can be further enhanced. Furthermore, the heat transfer characteristics can be improved by applying silicon grease or the like to the contact portion between the members in the heat transfer path 30 described with reference to FIG. 5. Additionally, the cooling can be more effectively achieved by boring holes in the carriage (not shown) or the cover (not shown) so as to well ventilate the neighborhood of the optical head I of the present invention or by letting external wind blow thereon to perform an air-cooling. These improvements fall within the scope of the present invention and do not depart from the spirit of the present invention.

Further, as stated above, the heat sink 27 is insulated from the heat transfer member 29 by the insulating film 28 (FIG. 5). Therefore, the heat radiator 10 is electrically insulated from the semiconductor laser 22. Thereby, even when external electric noises including static electricity are applied to the metallic heat radiator 10, no electric noises can be provided to the semiconductor laser 22. This serves to prevent the semiconductor laser 22 from being broken. Moreover, the heat transfer member 29 and the heat radiator 10 serving as a heat radiating element are electrically grounded. Thereby, the surroundings of the light receiving element of the laser optical system 20 are electrically shielded. Consequently, the degradation in characteristics of a reproduction signal owing to external electric noises can be prevented.

(Embodiment 2)

Figure 6:
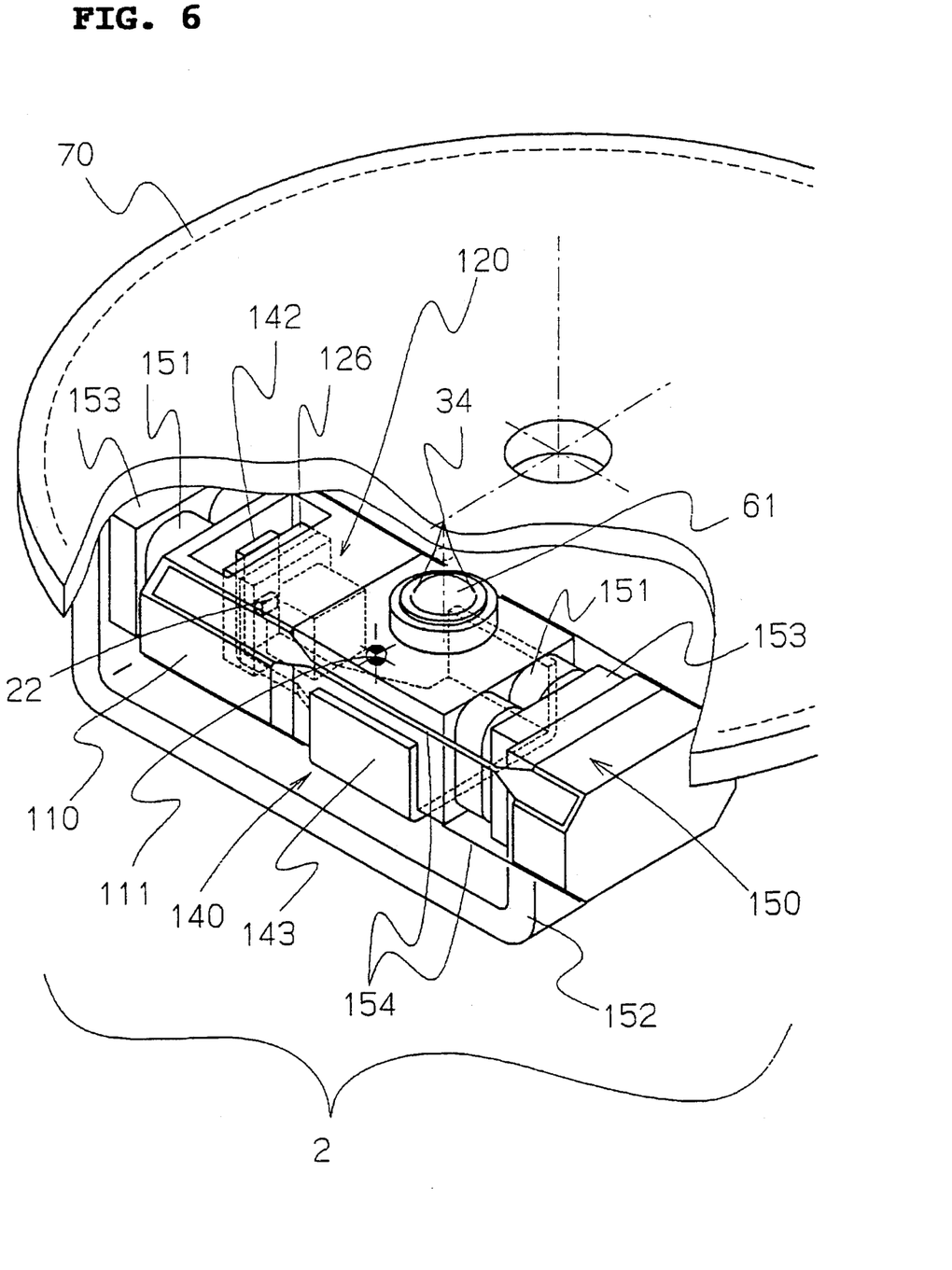
FIG. 6 is a perspective view of an optical head which is Embodiment 2 of the present invention.

FIG. 6 is a perspective view of a laser optical system 120 and a heat radiator 140, namely, the primary part of an optical head 2 which is Embodiment 2 of the present invention, and the surroundings thereof. Reference numeral 110 designates a holder for the optical head 2. The laser optical system 120 is enclosed in this holder to thereby form an integrated moving part 105. The holder 110 of this Embodiment 2 is molded from plastics such as PPS, differently from the heat radiator 10 of the aforementioned Embodiment 1. Further, the heat radiator 140 is made of an aluminum plate (or an alloy plate) in view of the workability and the heat conductivity and is shaped by performing a press forming. The material of the heat radiator is not limited to these plates. Alloy containing zinc, magnesium or the like may be used as the material of the heat radiator. A heat transfer portion 142 placed at an end of the heat radiator 140 is connected to the rear of a package 126 equipped with the semiconductor laser 22. A heat radiating portion 143 placed at the other end of the heat radiator is exposed in such a manner as to surround the holder 110 and is secured to the holder 110.

A plurality of coils 151 are fixedly mounted on the holder 110. The plurality of coils 151 and a magnetic circuit consisting of a yoke 152 and a magnet 153 placed on a stationary part (namely, on a carriage (not shown)) constitute what is called a moving coil type actuator 150. Further, reference numeral 154 denotes a suspension for holding the holder 110 movably. Incidentally, the details of the laser optical system 120 and the operating principle of the optical head 2 are similar to those in the case of Embodiment 1.

In the case of this Embodiment 2, heat generated by the semiconductor laser 22, which is enclosed in the laser optical system 120, during an operation thereof is transferred through the path from the semiconductor laser 22, the light receiving device 25 and the package 126. Finally, the transferred heat is radiated to the exterior of this embodiment. The package 126 is made of high heat conductivity ceramics (alumina, silicon carbide or the like). Further, the adjoining two of the composing elements are held in face-to-face contact with each other. Thus this embodiment has good heat conductivity characteristics. Incidentally, the surface area of the side of the heat radiating portion 143 of the heat radiator 140, which is exposed from the holder 110, is about 100 mm square. Therefore, more than half of the heat radiator 140 is exposed. Such a surface area is sufficient for radiating the heat generated by the semiconductor laser 22 enclosed in the laser optical system 120.

Consequently, similarly as in the case of the aforementioned Embodiment 1, the degradation of the semiconductor laser 22, as well as change in the signal characteristics due to the heating of the light receiving device 25, can be prevented. Moreover, the reliability of such an apparatus can be improved. The heat radiator 140 of this Embodiment 2 is rather small in capacity, or comparison with the radiator 10 of Embodiment 1. Conversely, the surface area of the former radiator is rather large. Thereby, the former radiator can have heat radiation effects equivalent to those of the latter radiator.

Further, the coil 151 of the actuator 150 is relatively close to the laser optical system 120. Thus, there is concern that the heat, which is generated by the coil 151 when driving the actuator, might be transferred to the laser optical system 120. However, the material of the holder 110 is a plastic whose heat conductivity is low. Therefore, the coil 151 hardly heats the laser optical system 120.

Figure 7:
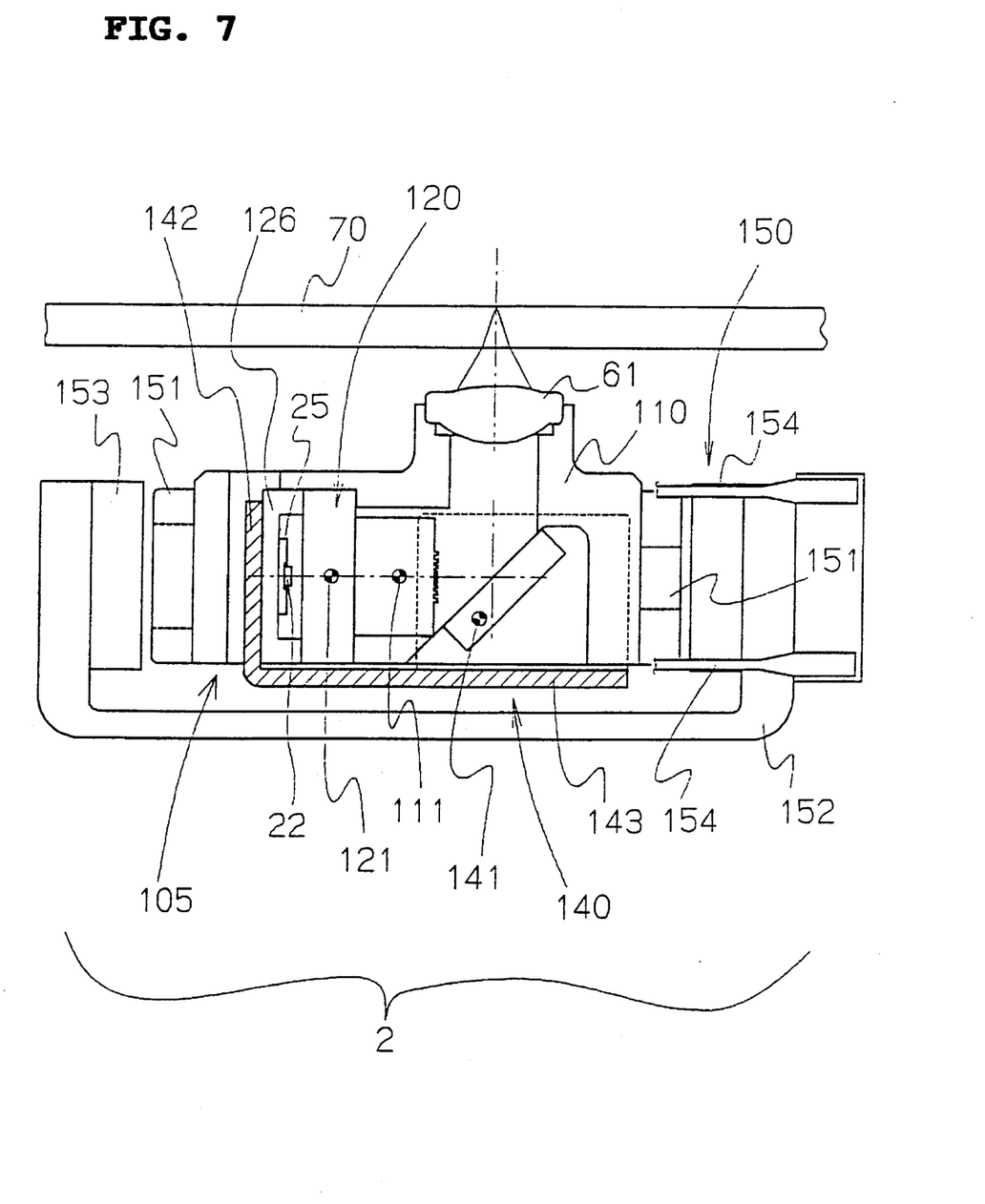
FIG. 7 is a sectional view of the optical head, namely, Embodiment 2 of the present invention.

FIG. 7 is a sectional view of the structure of the inside of the entire optical head 2 of Embodiment 2. The laser optical system 120 is enclosed in the aforementioned holder 110 to form the integrated moving part 105. In the holder 110, the mirror 60 and the objective lens 61 are mounted in addition to the laser optical system 120. All of these composing elements are driven as the integrated moving part. In the case of the integrated optical head 2, the laser optical system 120 is inevitably located at a position different from the position 111 of the center of gravity of the holder 110, namely, the moving part.

Figure 8:
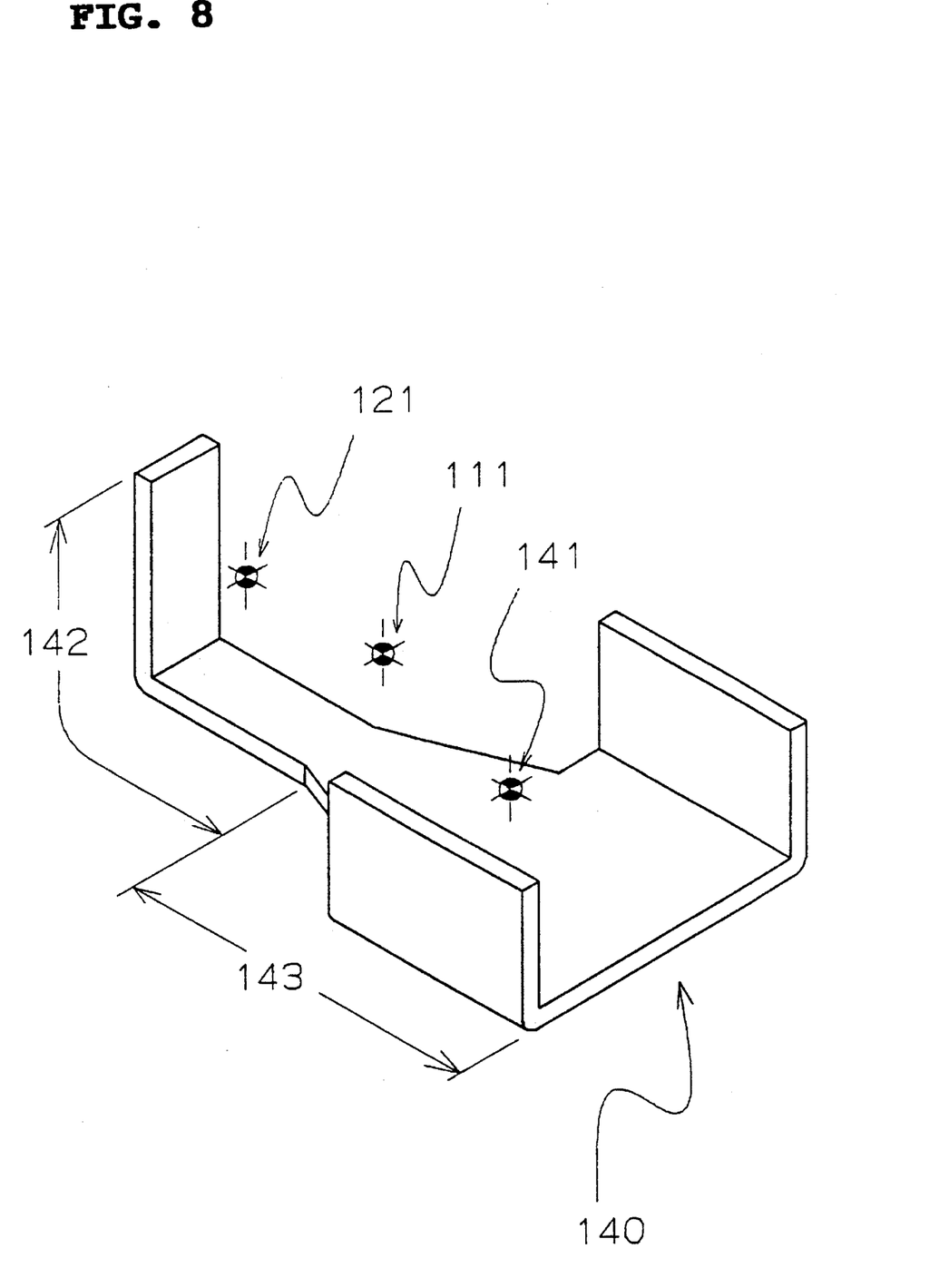
FIG. 8 is a perspective view of a heat radiator of Embodiment 2 of the present invention.

The heat radiator 140 has the shape as illustrated in FIG. 8 and weighs about 0.2 g. The heat radiating portion 143 occupies most of this weight. Practically, the heat radiating portion 143 weighs 0.15 g.; and the heat transfer portion 142 0.05 g. Further, it is essential to the present invention that the position 141 of the center of gravity of the heat radiator 140 and the position 121 of the center of gravity of the laser optical system 120 are on the opposing sides of the position 111 of the center of gravity of the holder 110, respectively, as shown in FIGS. 7 and 8. The laser optical system 120 of this embodiment weighs approximately 0.4 g. On the other hand, as described above, the heat radiating portion 143 of the heat radiator 140 weighs 0.15 g. Further, the objective lens 61 having a weight of about 0.1 g and the mirror 60 having a weight of about 0.15 g. are provided in the neighborhood of the heat radiating portion 143. Therefore, there are such composing elements having a total weight of 0.4 g. in the vicinity of the center 141 of gravity of the heat radiator 140. Consequently, the composing elements respectively provided on the opposing sides of the center 111 of gravity of the holder 110 are well balanced in weight.

Further, as described above, the heat radiating portion 143 is secured in such a manner as to surround the holder 110. Thus the heat radiator 140 has both the function of a balancer for correcting a deviation from the weight equilibrium between the elements provided on both sides of the holder 110 and the function of a reinforcing member for reinforcing the holder 110.

Generally, it is required for obtaining stable servo control characteristics or stable signal reproduction characteristics to let the actuator 150 serving as a drive mechanism for the optical head 2 operate stably without harmful resonance. Thus it is very important to eliminate the harmful resonance of the actuator 150. This harmful resonance is caused by the insufficiency of the rigidity of the holder 110 and the deviation from the weight equilibrium. However, in the case of the optical head of the present invention, the shape of the heat radiator 140 and the position of the center of gravity thereof are contrived as described above. Thereby, the heat radiator 140 functions as a balancer and corrects the balance of weight. Furthermore, as illustrated in FIG. 6, the heat radiating portion 143 of the heat radiator 140 is fixed in such a way as to surround the holder 110. Thus the rigidity, especially, the torsional rigidity of the holder 110 can be considerably increased. Consequently, the optical head of the present invention does not require any special member dedicated to reinforce the holder. Further, the heat radiator 140 serves as a reinforcing member and is an effective countermeasure against the harmful resonance.

Incidentally, in the case of this embodiment, a ceramic is used as the material of the package 126 of the laser optical system 120. However, the package may be made mainly of a metallic material, though a little increase in weight is expected. In this case, the heat conductivity characteristics can be further improved. Moreover, the optical path is bent by using the mirror 60 in order to reduce the thickness of the optical head 2. However, in case where a principal object is not reduction in thickness but is reduction in number of components, a linear optical system may be formed by omitting the mirror 60. However, in this case, the laser optical system is located at a position different from the position of the center of gravity of the holder. Therefore, it is necessary to design the shape of the heat radiator according to the technical idea of the present invention.

Further, in the case of this embodiment, the shape of the heat radiator 140 is formed in such a manner as to support or hold the holder 110 securely and upwardly. The present invention is not limited to such a shape of the heat radiator. Namely, the shape of the heat radiator 140 may be formed in such a fashion as to support or hold the holder 110 securely and downwardly.

INDUSTRIAL APPLICABILITY

As explained above, the optical head of the present invention can be used in an apparatus for recording information on and reproduced information from an optical disk. Further, the optical head of the present invention is the most suitable for various kinds of optical recording and reproducing apparatuses, each of which is equipped with a high-output semiconductor laser of the magneto-optic type or of the phase change type. Especially, the heat radiation/cooling characteristics of the semiconductor laser, which is the problem of the optical head of the integrally-driven type, can be considerably improved. Further, the control characteristics of the actuator can be improved. Therefore, the present invention makes a great contribution to the stabilization of operations of and the increase in reliability of a compact and simplified optical head and an optical recording and reproducing apparatus. Moreover, the present invention can be applied to an optical recording and reproducing apparatus which may employ not only an optical disk but a general optical storage medium, for instance, an optical card as an object to be written and read. Furthermore, the internal structure of the laser optical system is not limited to that of the aforesaid type that employs a hologram medium as light beam separation means. The present invention can be implemented in the case of employing the structure of the type that performs a light beam separation by means of a small-sized prism.

What is claimed is:

1. An integrally-driven type optical head in which a laser optical system provided with a semiconductor laser and a light receiving device is mounted in a moving part of an actuator, wherein the moving part is constituted by uniting a heat radiator made of a high heat conductivity material with a heat insulator made of a low heat conductivity material, wherein the heat conduction bonding of the heat radiator to the semiconductor laser is performed and a coil of the actuator is securely fixed to this heat radiator through the heat insulator.

2. The optical head according to claim 1, wherein the heat radiator is a holder for holding the laser optical system.

3. The optical head according to claim 1, wherein the heat radiator is made of a lightweight metal.

4. The optical head according to claim 3, wherein the lightweight metal is selected from the group consisting of a magnesium alloy and an aluminum alloy.

5. The optical head according to claim 1, wherein the heat insulator is made of a plastic.

6. The optical head according to claim 1, wherein the heat radiator is electrically insulated from the semiconductor laser.

7. The optical head according to claim 1, wherein the heat radiator is electrically grounded.

8. The optical head according to claim 1, wherein a heat transfer member is provided as a heat transfer path from the semiconductor laser to the heat radiator.

9. The optical head according to claim 1, wherein a compact heat sink or a heat spreader is embedded in a package enclosing the semiconductor laser, wherein said heat sink or heat spreader is made of a copper material.

10. An integrally-driven type optical head having a laser optical system provided with a semiconductor laser and a light receiving device, a holder equipped with said laser optical system and integrally driven, and an actuator serving as a mechanism for driving said holder, wherein the holder is provided with a heat radiator for transferring and radiating heat generated by the semiconductor laser, wherein the position of the center of gravity of said heat radiator and the position of the center of gravity of the laser optical system are respectively on the opposing sides of the position of the center of gravity of the holder, wherein said heat radiator is a balancer for correcting a deviation from the weight equilibrium between elements provided on both sides of the position of the center of gravity of the holder.

11. The optical head according to claim 10, wherein the holder is made of a low heat conductivity material and the heat radiator is made of a high heat conductivity material.

12. The optical head according to claim 11, wherein the low heat conductivity material is a plastic and the high heat conductivity material is a metal.

13. An integrally-driven type optical head having a laser optical system which encloses a semiconductor laser and a light receiving device, a holder equipped with the laser optical system and integrally driven, and an actuator serving as a mechanism for driving the holder, wherein the holder is provided with a heat radiator for transferring and radiating heat generated by the semiconductor laser, wherein the heat radiator is fixed to the holder and serves as a reinforcing member for reinforcing the holder.

14. An integrally-driven type optical head having a laser optical system which encloses a semiconductor laser and a light receiving device, a holder equipped with the laser optical system and integrally driven, and an actuator serving as a mechanism for driving the holder, wherein the holder is provided with a heat radiator for transferring and radiating heat generated by the semiconductor laser, wherein the heat radiator is fixed to the holder and serves as a reinforcing member for reinforcing the holder, and wherein the holder is made of a low heat conductivity material and the heat radiator is made of a high heat conductivity material.

15. The optical head according to claim 14, wherein the low heat conductivity material is a plastic and the high heat conductivity material is a metal.

\* \* \* \* \*